(12) United States Patent
Kauffman et al.

(10) Patent No.: US 9,518,198 B1
(45) Date of Patent: Dec. 13, 2016

(54) MATERIALS BASED ON DRYING OILS

(71) Applicants: William J. Kauffman, Manheim, PA (US); Walter J. Lewicki, Jr., Lancaster, PA (US)

(72) Inventors: William J. Kauffman, Manheim, PA (US); Walter J. Lewicki, Jr., Lancaster, PA (US)

( * ) Notice: Subject to any disclaimer, the term of this patent is extended or adjusted under 35 U.S.C. 154(b) by 0 days.

(21) Appl. No.: 15/206,749

(22) Filed: Jul. 11, 2016

Related U.S. Application Data

(60) Provisional application No. 62/285,578, filed on Nov. 2, 2015.

(51) Int. Cl.
| | | |
|---|---|---|
| *C09D 11/00* | (2014.01) | |
| *C09F 7/00* | (2006.01) | |
| *C09D 191/00* | (2006.01) | |
| *C09F 7/02* | (2006.01) | |
| *E04F 15/10* | (2006.01) | |

(52) U.S. Cl.
CPC .............. *C09F 7/00* (2013.01); *C09D 11/00* (2013.01); *C09D 191/005* (2013.01); *C09F 7/02* (2013.01); *E04F 15/10* (2013.01)

(58) Field of Classification Search
None
See application file for complete search history.

(56) References Cited

U.S. PATENT DOCUMENTS

| | | | | |
|---|---|---|---|---|
| 4,154,911 A | * | 5/1979 | Bak | C08J 5/10 156/910 |
| 5,145,929 A | * | 9/1992 | Ou-Yang | C09J 109/02 526/335 |
| 5,604,277 A | * | 2/1997 | Osborn | C08J 3/226 521/40.5 |
| 5,916,956 A | * | 6/1999 | Wang | C08J 3/226 521/134 |
| 2005/0011401 A1 | * | 1/2005 | Bauer | C04B 26/045 106/18.11 |

* cited by examiner

*Primary Examiner* — Melvin C Mayes
*Assistant Examiner* — Colette Nguyen
(74) *Attorney, Agent, or Firm* — McNees Wallace & Nurick LLC

(57) ABSTRACT

A binder composition comprising a partially pre-oxidized drying oil and at least one co-vulcanizing agent. A method provides rapid curing of the compositions. The materials find utility in flooring, coating, and decorating applications. One preferred utility is in the manufacture of linoleum type flooring. Another preferred utility is in the manufacture of a transparent/translucent coating for improving the wear properties of surfaces.

26 Claims, No Drawings

MATERIALS BASED ON DRYING OILS

CROSS REFERENCE TO RELATED APPLICATIONS

This application claims the benefit of a previously filed U.S. Provisional Application No. 62/285,578 filed on Nov. 2, 2015, which is incorporated by reference in its entirety herein.

FIELD OF THE INVENTION

The invention is directed to binder compositions having a partially pre-oxidized drying oil and at least one co-vulcanizing agent and their methods of manufacture.

BACK GROUND OF THE INVENTION

Drying oils harden/cure after a period of exposure to air. The oil hardens through a chemical reaction in which the components crosslink by action of oxygen—air oxidation. Drying oils include but are not limited to natural oils such as linseed oil, Tung oil, sunflower oil, walnut oil, poppy oil, *perilla* oil, and air drying synthetic alkyd resins. These materials are utilized in coatings, paints and flooring.

For example, the manufacture of Linoleum flooring involves partially air oxidizing linseed oil until a select viscosity is obtained. This partially pre-oxidized/cured material is called Lynoxyn. Lynoxyn is then mixed with rosin, fillers and pigments and subsequently consolidated into solid layer, typically on a backing material to form a flooring structure. At this stage, the flooring does not possess the desired physical properties and needs to be further oxidatively cured by "stoving" at slightly elevated temperature in circulating air. This curing process takes considerable time such as 8-16 weeks before desired properties are obtained. Although there have been some improvements in linoleum curing times, there remains a need for more rapid curing of these materials. More rapid curing of these materials have advantages in coating applications as well.

SUMMARY OF THE INVENTION

This invention describes a binder composition comprising a partially pre-oxidized drying oil and a co-vulcanizing agent. In one embodiment, the binder composition further comprises at least one radical initiator, and oxygen is removed from the binder composition and further cured by heating at elevated temperature in inert conditions.

In another embodiment, the binder composition comprises a co-vulcanizing agent that can be co-reacted with the partially pre-oxidized drying oil under normal oxidation conditions.

In another embodiment, the co-vulcanizing agent is partially reacted with the pre-oxidized drying oil under oxidative conditions, and then can be further cured under radical conditions if oxygen is not present.

In one embodiment, the partially pre-oxidized drying oil is Lynoxyn. In other embodiments, processes are defined to make and cure the binder compositions comprising the partially pre-oxidized drying oil and co-vulcanizing agent. In other embodiments, products comprising the defined binder composition are defined including coatings, and filled solid layers. One preferred embodiment is the use in linoleum like flooring. In another preferred embodiment, a transparent coating for use as a wear layer is described.

DESCRIPTION OF THE INVENTION

The detailed description set forth below is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

All percentages and ratios are calculated by weight unless otherwise indicated. All percentages are calculated based on the total weight of a composition unless otherwise indicated. All component or composition levels are in reference to the active level of that component or composition, and are exclusive of impurities, for example, residual solvents or by-products, which may be present in commercially available sources.

This invention describes the manufacture of materials based upon modification of drying oils. Drying oils harden after a period of exposure to air. The oil hardens through a chemical reaction in which the components crosslink by action of oxygen—air oxidation. Drying oils include but are not limited to natural oils such as linseed oil, Tung oil, sunflower oil, walnut oil, poppy oil, *perilla* oil, and drying synthetic alkyd resins. Typically, these drying oils are partially reacted with oxygen until a desired viscosity is achieved—polymer binder. The materials of this invention comprise the addition of a reactive co-vulcanizing agent with the polymer binder. Through a series of process steps, these materials react significantly reducing curing time.

In one embodiment, a material of this invention comprises a reactive co-vulcanizing agent compounded with a partially pre-oxidized drying oil binder. Through a series of process steps, this invention allows rapid curing of the compositions that require little or no stoving time.

The elements of this invention can be described by the following Lynoxyn examples. The oxidation of linseed oil to produce Lynoxyn is well known and has been the basis of the manufacture of Linoleum flooring. One issue in the manufacture of linoleum is that once the Lynoxyn binder is compounded into a Linoleum formulation and processed into a flooring structure it requires additional oxidation for considerable time to develop the necessary physical properties required to function as a resilient flooring layer or material. This is usually accomplished by stoving at slightly elevated temperatures with air flowing through the stoving equipment. Historically this could take up to 8 weeks to 16 weeks to reach desired curing conditions. Although there has been some improvement in air curing time, there is still a need for more rapid curing of these materials.

In this example, the Lynoxyn produced by partially pre-oxidizing linseed oil is compounded with a co-vulcanizing agent to produce a modified binder composition. In one embodiment, the co-vulcanizing agent is one that can be co-reacted with Lynoxyn under normal oxidation conditions. Additionally, the co-vulcanizing agent can be self-reacted under radical conditions if oxygen is not present. Non-limiting examples of co-vulcanizing agents include triallyl cyanurate, triallyl isocyanurate, trimethanolpropane triallyl ether, pentaerythritol tetra allyl ether, or other materials that include an activated alpha methylene group adjacent a peroxide curable double or triple bond. These can be monomeric or polymeric in nature.

In general, the co-vulcanizing agent can be added from 5% up to 100% by weight of the pre-oxidized drying oil depending upon the co-vulcanizing agent's composition and processing conditions. In various illustrative embodiments the co-vulcanizing agent is at least around 5%, at least around 10%, at least around 15%, at least around 20%, at least around 25%, at least around 30%, at least around 35%, at least around 40%, at least around 45%, at least around 50%, by weight of the pre-oxidized drying oil. One embodiment has the co-vulcanizing agent at a 15%-30% level.

There are several process options that are available for making and using the binder composition of this invention, depending upon materials selected and desired curing conditions. In one process option, the co-vulcanizing agent is allowed to react with the Lynoxyn under oxidative conditions till a desired viscosity is obtained. The reaction may be quenched as done in the normal linoleum process. This modified Lynoxyn binder is then processed into Linoleum and subjected to oxidative stoving conditions. The cure time to achieve desired properties is significantly reduced, such as, but not limited, 2 weeks or less before the desired properties are obtained.

It is also possible to quench the Lynoxyn self-reaction and blend the co-vulcanizing agent into the quenched Lynoxyn. Processing into linoleum is done and the co-reaction of the Lynoxyn and co-vulcanizing agent is achieved during the stoving process. Physical properties are obtained at reduced stoving time.

In a second process option, the co-vulcanizing agent is allowed to react with the Lynoxyn under oxidative conditions till a desired viscosity is obtained. Subsequently, the co-reacted material is deaerated and oxygen removed, effectively stopping or controlling the co-reaction to produce a desired binder composition. A radical initiator is added to the binder under inert conditions. The resultant composition is then formulated into a Linoleum formulation, for example, by compounding with rosin, filler, such as wood flour and chalk whiting, under inert conditions. The formulation is formed into a layer and heated at elevated temperature under inert conditions to initiate radical induced cross-linking. It is also possible to compound the above Linoleum formulation under normal conditions and deaerating the formulation to remove oxygen before heating at an elevated temperature under inert conditions to initiate radical induced cross-linking. Depending upon selection of the co-vulcanizing agent and its percentage in the binder formulation, little, if any stoving in air is required to achieve physical properties.

In a third process option, the Lynoxyn is deaerated thus removing oxygen before the addition of the co-vulcanizing agent. Typically, the co-vulcanizing agent is also deaerated and oxygen is removed prior to mixing. In one embodiment, the mixing of the deaerated Lynoxyn and co-vulcanizing agent is done in an inert atmosphere. Subsequently, a radical initiator such as a peroxide is mixed into the binder material under inert conditions. The resultant composition is then formulated into a linoleum like formulation, formed into a layer and heated at elevated temperature under inert conditions to initiate radical induced cross-linking. Depending upon selection of the co-vulcanizing agent and it's percentage in the binder formulation, little, if any stoving in air is required to achieve physical properties.

It is understood that some stoving time or annealing time may still be desired to achieve desired properties, for example, improved dimensional stability of the final product, depending upon the formulation composition and process option selected.

In another embodiment, a solid or multi-color layer can be produced in a continuous extruder type process using the second or third process options described above. Additionally, other materials such as particles can be applied and processed into the solid layer to provide other visual effects. A double belt press, is used to form a patterned flooring product based on a combination of Lynoxyn, using the second or third process options described above and an extruder. Examples of belt surfaces include but are not limited to Teflon, silicone, stainless steel, polypropylene paper, and the like.

Typically, the layer is formed on a backing material and heated under inert conditions to initiate the radical cross-linking of the co-vulcanizing agent. The temperature selected is dependent upon the initiator used, and the desired kinetics of radical generation. More than one radical generator can be utilized in the formulation. It is understood that the layer can be formed onto known substrates: such as woven and non-woven backings containing natural and synthetic materials, felt or glass backings, stainless steel, Teflon or silicone belts, and/or release paper. In another example, embossed release paper or design carrying belts or plates can be used to impart 3-D dimensionality to one or both sides of the layer. It is also understood that other well-known options for heating and curing the layer may be used, such as the use of double stainless steel and Teflon-coated double belt presses.

In yet another embodiment, inert curing conditions are not required. For example, applying an impermeable layer, to the surface of the linoleum layer, inhibits oxygen from penetrating into the linoleum layer during the curing process. The impermeable layer may be a transparent wear layer, a decorative layer, and/or a combination of a wear layer and decorative layer. The layer is applied by lamination, coating prior to curing, or a combination of lamination and/or coating prior to final cure. The methods used by those skilled in the art to make a surface of a substrate impervious to oxygen and or moisture are well known.

In another embodiment, the binder composition can be formulated into non-traditional formulations to produce new materials for use as flooring layer or other applications. For example, the binder composition without opaque fillers can be processed into a transparent/translucent coating or ink, and subsequently cured using thermal or radiation techniques. Radiation techniques include, but are not limited to e-beam and UV curing, forms of electromagnetic radiation that enhance cure of polymeric compositions. In another example, the binder composition can incorporate aluminum oxide, ceramic, or other hard particles to improve surface performance.

In another embodiment, a UV initiator is added to the transparent coating composition and the applied coating is subsequently UV cured. In one embodiment, the transparent, cured coating functions as a wear layer for a resilient material.

In another embodiment, the binder with or without fine abrasion resistant particles can be used as an ink or coating for non-resilient surfaces such as wood, ceramic tile, painted metal and the like.

In yet another embodiment, colorants can be added to the binder composition and be used for decorative purposes. In one embodiment, the colorant/binder composition functions as an ink in printing. The decorative ink can be cured using thermal and/or radiation techniques.

It is understood that other partially oxidized drying oil binders can be utilized in similar fashion as described in the above Lynoxyn Examples. Each oxidized drying oil binder may require a different co-vulcanization agent and different curing conditions. These compositions have multiple use applications.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed:

1. A binder composition comprising a partially pre-oxidized drying oil and at least one co-vulcanizing agent.

2. The binder composition of claim 1, wherein the co-vulcanizing agent is at least around 5% by weight of the pre-oxidized drying oil.

3. A binder composition of claim 1, wherein the co-vulcanizing agent is reacted with the partially pre-oxidized drying oil under normal oxidation conditions.

4. The binder composition of claim 1, wherein the drying oil is a natural drying oil.

5. The binder composition of claim 1, further comprising at least one radical initiator.

6. A binder composition of claim 5, wherein the co-vulcanizing agent is reacted under radical conditions.

7. A binder composition of claim 3, wherein the reacted co-vulcanizing agent, is further reacted under radical conditions.

8. The binder of claim 1 wherein the pre-oxidized drying oil comprises a mixture of drying oils.

9. A layer comprising the binder composition of claim 1.

10. The layer of claim 9, wherein the layer is cured using thermal initiators or electromagnetic radiation.

11. The layer of claim 9, wherein the partially pre-oxidized drying oil is Lynoxyn.

12. The layer of claim 11, that requires significantly shorter curing times with little or no stoving conditions required.

13. The layer of claim 9, wherein the co-vulcanizing agent is reacted with the partially pre-oxidized drying oil under oxidative conditions.

14. The layer of claim 13, wherein oxygen is then removed from the composition, a radical initiator added, and the layer cured by heating under inert conditions to initiate radical generation.

15. The layer of claim 9, wherein the partially oxidized drying oil and co-vulcanizing agent are mixed under inert conditions, a radical initiator added, and the layer cured under inert conditions to initiate radical generation.

16. The layer of claim 9, wherein a continuous extruder process is utilized to make the layer.

17. The layer of claim 9, wherein the layer is a resilient material.

18. A flooring material comprising the layer of claim 9.

19. The flooring material of claim 18, wherein the pre-oxidized drying oil is Lynoxyn.

20. A coating composition comprising the binder composition of claim 1.

21. The coating composition of claim 20, wherein the coating is transparent or translucent.

22. The coating composition of claim 21, wherein the coating is a wear surface.

23. The coating composition of claim 22, wherein the coating contains abrasion resistant particles.

24. The coating composition of claim 21, wherein the coating contains a UV initiator and the composition is cured using UV light.

25. The coating composition of claim 20, wherein the coating contains colorants.

26. The coating composition of claim 20, wherein the coating is utilized as an ink.

* * * * *